(12) United States Patent
Roubideaux

(10) Patent No.: US 10,786,962 B2
(45) Date of Patent: Sep. 29, 2020

(54) REBALING SYSTEMS AND METHODS

(71) Applicant: Clayton Roubideaux, Utica, SD (US)

(72) Inventor: Clayton Roubideaux, Utica, SD (US)

( * ) Notice: Subject to any disclaimer, the term of this patent is extended or adjusted under 35 U.S.C. 154(b) by 785 days.

(21) Appl. No.: 15/282,359

(22) Filed: Sep. 30, 2016

(65) Prior Publication Data

US 2018/0093438 A1    Apr. 5, 2018

(51) Int. Cl.
*B30B 9/30* (2006.01)
*A01F 15/00* (2006.01)
*B65G 57/28* (2006.01)

(52) U.S. Cl.
CPC .......... *B30B 9/3035* (2013.01); *A01F 15/005* (2013.01); *B30B 9/301* (2013.01); *B65G 57/28* (2013.01)

(58) Field of Classification Search
CPC ........ A01F 15/00; A01F 15/005; A01F 15/10; A01F 15/101; A01F 15/02; A01F 15/103; A01F 15/105; A01F 17/00; A01F 17/02; A01F 29/00; A01F 29/005; B30B 9/30; B30B 9/3003; B30B 9/301; B30B 9/3035
USPC ................ 100/39, 94–97, 102; 198/657–677
See application file for complete search history.

(56) References Cited

U.S. PATENT DOCUMENTS

| | | | |
|---|---|---|---|
| 3,082,588 A | 3/1963 | Jay et al. | |
| 3,208,491 A | 9/1965 | Bliss | |
| 3,587,877 A * | 6/1971 | Hornibrook | A01D 85/005 414/111 |
| 3,621,901 A * | 11/1971 | Dodgen | A01F 29/005 241/101.762 |
| 3,746,186 A * | 7/1973 | Taylor | A01D 85/005 414/789.7 |
| 4,408,947 A * | 10/1983 | Lenski | A01F 12/46 198/608 |
| 4,982,658 A | 1/1991 | Knundson | |
| 5,201,266 A | 4/1993 | Schmalz et al. | |
| 5,887,504 A * | 3/1999 | Gombos | A01D 85/005 83/425.2 |
| 5,893,309 A * | 4/1999 | Ast | A01F 29/00 100/3 |
| 5,927,188 A | 7/1999 | Gombos et al. | |
| 6,152,026 A | 11/2000 | Simpson | |

(Continued)

FOREIGN PATENT DOCUMENTS

WO    WO 2015/187012 A1    12/2015

OTHER PUBLICATIONS

International Search report and Written Opinion directed to related International Patent Application No. PCT/US17/54029, dated Jan. 26, 2018; 13 pages.

*Primary Examiner* — Shelley M Self
*Assistant Examiner* — Katie L. Parr
(74) *Attorney, Agent, or Firm* — Sterne, Kessler, Goldstein & Fox P.L.L.C.

(57) ABSTRACT

A rebaling system may include a bale processing system that processes a first bale of a first size into unbaled material; a rebaler downstream of the bale processing system, the rebaler rebaling the unbaled material into a second bale of a second size different than the first size prior to being processed; a collection platform positioned below a portion of the rebaling system that collects stray unbaled material; and a recycling system including a first auger operatively engaged with the collection platform to move collected stray unbaled material to be reintroduced to the rebaling system.

12 Claims, 7 Drawing Sheets

(56) References Cited

U.S. PATENT DOCUMENTS

| | | | |
|---|---|---|---|
| 6,579,552 B1* | 6/2003 | Myhre | A01F 15/00 |
| | | | 100/3 |
| 6,631,672 B2 | 10/2003 | Hierden | |
| 8,656,831 B2* | 2/2014 | Viaud | A01F 15/085 |
| | | | 100/88 |
| 9,004,742 B2* | 4/2015 | Burke | D21C 1/00 |
| | | | 100/45 |
| 2006/0072985 A1 | 4/2006 | Simpson | |
| 2009/0000263 A1* | 1/2009 | Gossop | A01D 41/00 |
| | | | 56/432 |
| 2009/0235628 A1* | 9/2009 | Derstine | A01F 15/005 |
| | | | 56/341 |
| 2010/0205860 A1* | 8/2010 | Kawami | B30B 11/26 |
| | | | 44/597 |
| 2017/0112056 A1* | 4/2017 | Sierra | A01D 41/127 |

\* cited by examiner

REBALING SYSTEMS AND METHODS

FIELD

The described embodiments relate generally to rebaling systems and methods. More particularly, the described embodiments relate to rebaling systems and methods for use converting large round bales of material into relatively smaller rectangular bales.

BACKGROUND

Rebaling systems, products, components, and methods may be used in a variety of context, including in an agricultural context, for example, or an industrial context.

SUMMARY

In general, rebaling systems have many applications, for example agricultural applications, industrial applications, and the like.

Some embodiments are directed to a rebaling system including a bale processing system, the bale processing system configured to process a first bale of a first size into unbaled material, a rebaler downstream of the bale processing system, the rebaler configured to rebate the unbaled material into a second bale of a second size different than the first size prior to being processed, a collection platform positioned below a portion of the rebaling system configured to collect stray unbaled material, and a recycling system including a first auger operatively engaged with the collection platform to move collected stray unbaled material to be reintroduced to the rebaling system.

In some embodiments, the recycling system may include a drive motor configured to actuate the first auger and a controller configured to activate the drive motor when a predetermined amount of stray unbaled material is collected. In some embodiments, the recycling system may include a second auger positioned laterally from and operatively engaged with the first auger, and a third auger positioned laterally from and operatively engaged with the second auger, wherein the collected stray unbaled material is advanced from the first auger below the rebaling system to the second auger such that it is advanced to a side of the rebaling system and then to the third auger such that it is reintroduced into the rebaling system. In some embodiments, the collected stray unbaled material is reintroduced into the bale processing system. In some embodiments, this may increase the efficiency of the recycling system. In some embodiments, the recycling system may be hydraulically powered, or electrically powered.

In some embodiments, the rebaling system may include a leveling system configured to mix the unbaled material such that the material input into the rebaler is a substantially consistent density.

In some embodiments, the bale processing system may include a first processor configured to process a first material, and a second processor configured to process a second material. In embodiments, the first and second processors may be adjustably configured to process a first material into a first size and a second material into a second size different than the first size.

In some embodiments, the rebaling system may include an automatic stacking system having an accumulator configured to receive the second bale, the accumulator having a first pusher aim configured to advance the second bale, a switch operatively connected to a tilting stacking table, wherein the switch is activated when a predetermined number of second bales are positioned in the accumulator, the switch initiating a tilting operation of the tilting stacking table thereby stacking the second bales.

Some embodiments are directed to a rebaling system including a bale processing system configured to process a first bale of a first size into unbaled material, a rebaler downstream of the bale processing system, the rebaler configured to rebale the unbaled material into a second bale of a second size different than the first size prior to being processed, and a leveling system configured to mix the unbaled material such that the material input into the rebaler is a substantially consistent density.

In some embodiments the bale processing system may include a first processor configured to process a first material, and a second processor configured to process a second material. In some embodiments the first and second processors may be adjustably configured to process a first material into a first size and a second material into a second size different than the first size. In some embodiments, each of the first and second processors may include a fixed rotary cutting blade, and a vertically adjustable cutting blade operatively engaged with the fixed rotary cutting blade such that the bale material may be cut to a first size and a second size different than the first size.

In some embodiments, the leveling system may include a fixed rotary leveling device, and a vertically adjustable leveling device operatively engaged with the fixed rotary leveling device such that the feed of the mixed bale material into the rebaler may be adjusted. In some embodiments, the leveling system may be configured to advance the unbaled material along the system and into the rebaler, the leveling system being inclined from horizontal along the direction travel of unbaled material.

Some embodiments are directed to a method of rebaling material, including processing a first bale of a first size into unbaled material using a processing system, advancing the unbaled material to an adjustable leveling system, the leveling system being inclined toward a rebaler, passing the unbaled material through the leveling system such that the density of the unbaled material input into the rebaler is substantially uniform, rebaling the unbaled material into a second bale of a second size different than the first size prior to being processed. In some embodiments, the method may include mixing a first unbaled material and a second unbaled material in the leveling system. In some embodiments, the first unbaled and second unbaled material are selected from hay, grass, alfalfa, or the like. In some embodiments, the first and second unbaled material are different. In some embodiments, the method may include collecting stray unbaled material, and introducing the stray unbaled material into the leveling system. In some embodiments, the method may include collecting stray unbaled material, and introducing the stray unbaled material into the processing system. In some embodiments, the bale material may be inorganic material.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
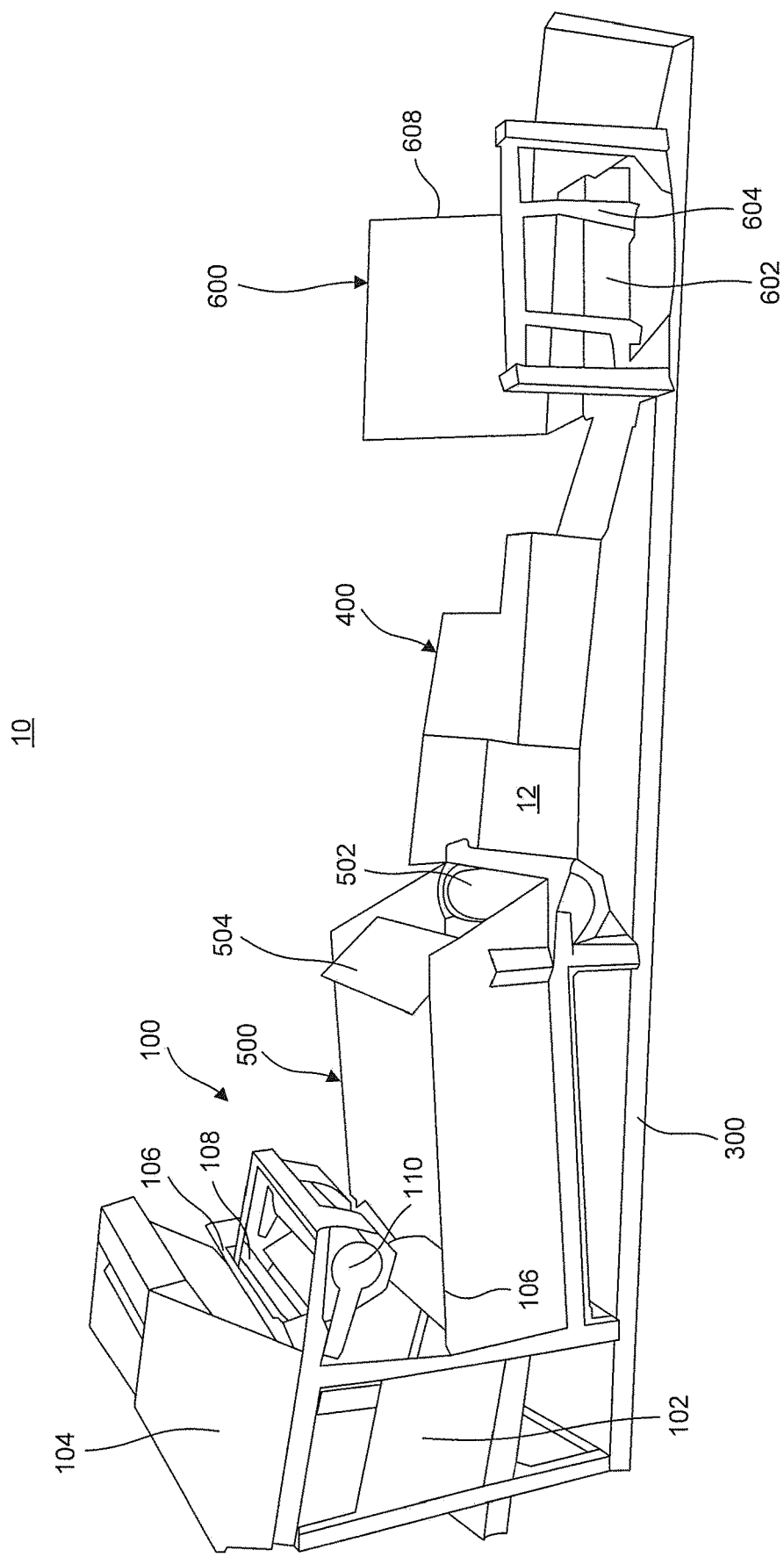
FIG. 1 shows a rebaling system according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the agricultural environment, for example, a farmer may increase market share of certain end products, and make use of rebaling systems to rebale material to different sizes, compositions, etc., for different customers.

Baling of farm, agricultural, and industrial product is advantageous for sale and transport of certain materials. For example, when hay is cut in a field, it is sometimes baled in large round bales by a machine pulled behind a tractor. These bales are then sold to farms as feed for livestock, particularly cattle or horses. These large round bales may be stored for some time in order to be sold later, however if they are kept too long they may incur rot or other undesirable characteristics that would make it less likely to be sold. Large volumes of product, such as hay, grasses, etc., may be harvested directly from the long lines of material (e.g., windrows) in the fields. These large volumes of product are then baled in a way as to be tightly compacted and more easily transported or sold. Other machines make relatively smaller square or rectangular bales, for example for hobby farms, decoration, or easy moving of the hay within a barn.

In general, rebaling systems may require adjustability to accommodate different types of material, such as hay, grasses, alfalfa, or the like. Large waste streams are inefficient, and so a system to recycle the waste produced is advantageous. Automation of certain systems may be advantageous, such as the leveling system to ensure consistent material feed to the rebaler, along with automated stacking, may be advantageous.

If a farmer having many large bales of hay is unable to sell them all in their baled form, it is advantageous to be able to unbale them in the large round format and rebale them into the smaller format, giving the supply chain added agility and farmer extra insurance that the product will not spoil waiting to be sold. Additionally, it has been shown that on a per volume basis, the smaller square bales command a premium in the marketplace, generating additional revenue for the farmer that may have been lost if the large round bales had not been sold.

Prior systems of rebaling lead to inconsistent properties of the final bales, such as density, or in the case of mixed material bales, inconsistent mixing of the various components. Further problems of inconsistent dimensions and weight have not been adequately addressed.

Additionally, prior systems fail to adequately address the large amount of waste product falling below the machine during operation. Finally, the operational requirements of feeding the rebaler with usable material, as well as stacking the final smaller bales of material typically makes use of large amounts of manual labor. Automating operations such as feeding of material and stacking the finished bales may increase throughput and decrease opportunities for workplace injury or fatality.

Moreover, conventional baling and rebaling systems generate large amounts of waste that is not adequately addressed. While some recycling systems may be employed, prior systems have utilized large fans to clear out chaff. These systems do not adequately capture the waste and chaff, and also require separate powering, are loud, and create additional failure potentials that are not addressed. The present system addresses these shortcomings, and additionally accommodates varying material size and moisture levels, and reclaiming any chaff or other waste that may be generated.

As discussed above, prior systems of rebaling lead to inconsistent properties of the final bales, such as density, or in the case of mixed material bales, inconsistent mixing of the various components. Further problems of inconsistent dimensions and weight have not been adequately addressed. Prior systems have not addressed large amount of waste product falling below the machine during operation and the inefficiencies flowing therefrom. Finally, the operational requirements of feeding the rebaler with usable material, as well as stacking the final smaller bales of material typically makes use of large amounts of manual labor. Automating operations such as feeding of material and stacking the finished bales may increase throughput and decrease opportunities for workplace injury or fatality.

The rebaling systems and methods according to embodiments described herein, or elements thereof, accomplish one or more of these and other objectives.

References to "one embodiment," "an embodiment," "some embodiments," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following disclosure relates to rebaling systems, related systems, components, and methods.

As shown in the figures such as FIG. 1, some embodiments are directed to a rebaling system 10. In some embodiments, rebaling system 10 includes a bale processing system 100. In some embodiments, rebaling system 10 may be portable, for example, self-contained on a trailer (e.g., a trailer of approximately 48' in length). In some embodiments, components of rebaling system 10 may be separable, in order to increase portability. In some embodiments, rebaling system 10 may be powered in whole or in part by a biodiesel generator, thereby limiting environmental impact.

Figure 7:
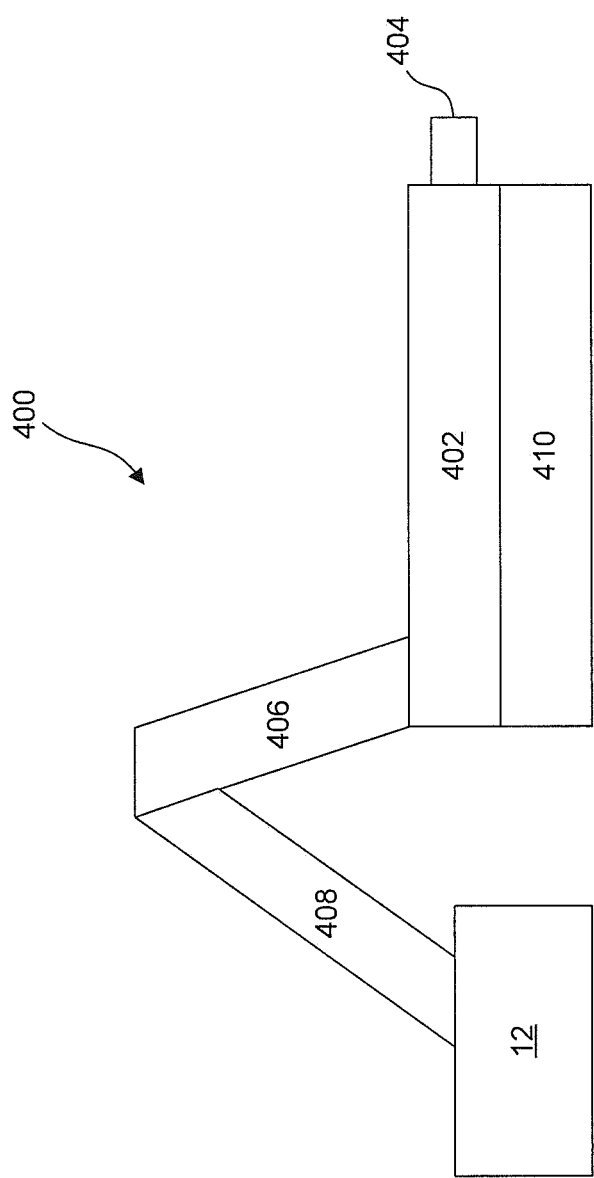
FIG. 7 shows a schematic partial top view of a recycling system according to an embodiment.

In embodiments, bale processing system 100 may be configured to process a first bale of a first size into unbaled material. In embodiments, a rebaler 200 (positioned downstream of bale processing system 100) may be configured to rebale the unbaled material into a second bale of a second size different than the first size prior to being processed. In embodiments, a collection platform 300 may be positioned below a portion of rebaling system 10 and may be configured to collect stray unbaled material. In some embodiments, a recycling system 400 may include a first auger 402 operatively engaged with collection platform 300 to move collected stray unbaled material to be reintroduced to rebaling system 10, as shown in FIG. 7, for example. In various FIGS., the material path is referenced with element number 12, denoting the general path the bale material takes as it travels through the system. Material path 12 may include, for example, coveyors, sliders, apron chain, space-making chain, augers, etc. Material path 12 may be continuous, or discontinuous, and may utilize multiple types of material advancing technologies.

In some embodiments, rebaling system 10 may process less than 5 tons of hay per hour. In some embodiments, rebaling system 10 may process between 5 tons and 10 tons of hay per hour. In some embodiments, rebaling system may process between 10 tons and 15 tons of hay per hour. In some embodiments, rebaling system may process approximately 10 tons of hay per hour. In some embodiments, the smaller bales produced by the rebaler may be rectangular bales, square bales, or round bales. In some embodiments, the smaller bales may be feed bales. In some embodiments, the small bales may weigh less than 120 pounds, less than 100 pounds, less than 80 pounds, less than 60 pounds, or less than 50 pounds.

Figure 2A:
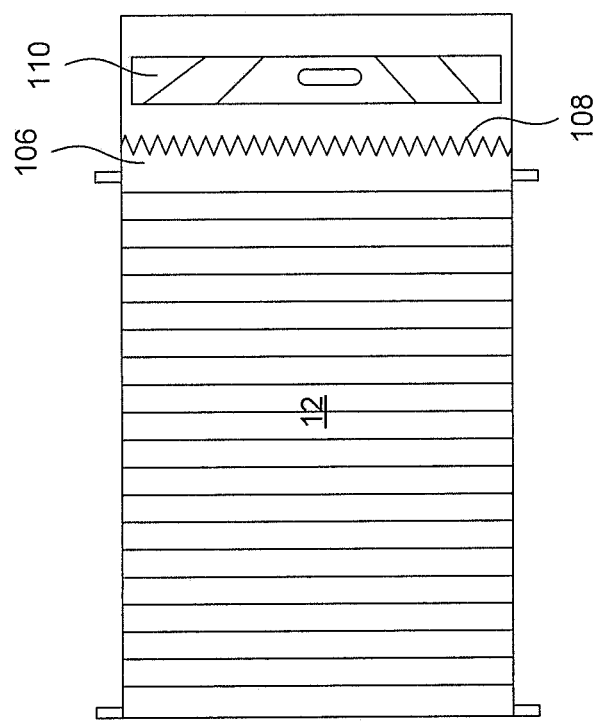
FIG. 2A shows a top view of a processor according to an embodiment.
Figure 2B:
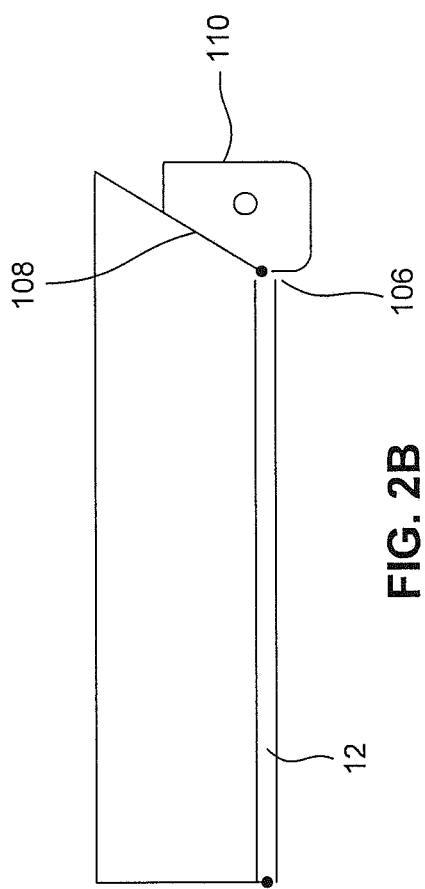
FIG. 2B shows a side view of a processor according to an embodiment.
Figure 3B:
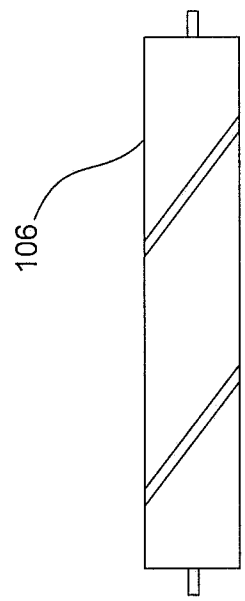
FIG. 3B shows a rotary cutting blade according to an embodiment.
Figure 3A:
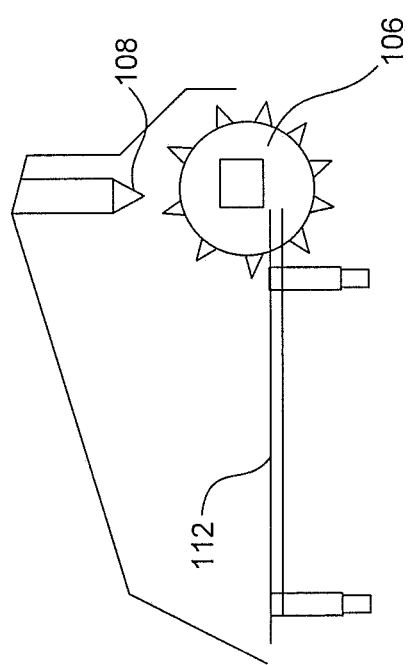
FIG. 3A shows a partial side cut view of a processor according to an embodiment.

In some embodiments, bale processing system 100 may include a first processor 102 configured to process a first material, and a second processor 104 configured to process a second material. In embodiments, the first and second processors 102/104 may be adjustably configured to process a first material into a first size and a second material into a second size different than the first size. These features are shown in FIGS. 2A, 2B, 3A, and 3B, for example. As shown in FIGS. 2A and 2B, each of the first and second processors may include at least one of a fixed rotary cutting blade 106, a vertically adjustable cutting blade 108, and a floating auger 110. Floating auger 110 may turn the material (e.g., hay, grass, other composition etc.) into a windrow once processed from the larger bale, thereby ensuring proper feed to rebaler 200. In some embodiments, fixed rotary cutting blade 106 and vertically adjustable cutting blade 108 are operatively engaged with each other such that the bale material may be cut to a first size and a second size different than the first size. In some embodiments, blades 106/108 may be configured as fixed plane sickle blades. In some embodiments, the various sizes may be manually adjustable, or the system 10 may automatically adjust the size in response to certain parameters (e.g., bale density, cycle time, electric or hydraulic load, etc.).

In some embodiments, the first or second processor 102/104 may process hay, straw, or other grasses, e.g., alfalfa. In some embodiments, first processor 102 may process a different material than second processor 104. In some embodiments, first and second processor 102/104 may process the same material. First or second processor 102/104 may include a device (e.g., a bar) configured to plane material (such as hay) off of a large round bale as the processing system 100 advances bales through the system. In some embodiments, bale processing system may advance the bales at a variable speed and the device configured to plane material may be raised or lowered according to desired material flow for blending. In some embodiments, processors 102/104 may include a sickle that planes material off of the bale. In some embodiments, this configuration will decrease leaf and stem separation. In some embodiments the sickle may be adjustable in order to control material flow into rebaler 400. In some embodiments, first or second processor 102/104 may include a wobble box to allow for back and forth motion in order to promote more even mixing.

In some embodiments, first or second processor 102/104 may include a plane sickle, designed as a fixed or adjustable cutter. In some embodiments, first or second processor 102/104 may include drum-type cutter, that may be configured to cycle sections or sickle blades in order to process material. In some embodiments, the blades may spiral around a drum in a particular pattern. In some embodiments, over an approximately 2' diameter drum section, blades may be spiraled approximately 2" along the axis of the drum and approximately 1" down along the surface of the drum. In some embodiments, the drum may be an 18" drum, having a spiral pattern of approximately 1" along the axis of the drum and approximately 2" down. In some embodiments, the blades may be spiraled around the entirety of the drum section. As used herein, "approximately" is used to denote +/−50% of the relative dimension. In some embodiments, multiple blades may be attached at a single location, having opposing blade surfaces, in order to allow for reversing the drum-type cutter and thereby increasing system life as well as optimizing blending.

In some embodiments, each processor 102/104 may be independently adjustable in order to cut material for optimal length for the optimal blending mix. For example, some grasses may mix better when the fibers are relatively shorter, whereas other may mix better when fibers are longer. Because of the independent control, operators may select multiple sizes of material to blend. Combined with portability, this leads to additional options for blending specific grasses. In some embodiments, processing system 100 includes material path 12 driven for example with an apron chain using hydraulic power for speed adjustment to further optimize the best mix of material. The cycle sections are staggered around an 18" drum 1" over and 2" down until spiral around for balance. Each of the processors may be independently powered, for example by an electric motor. In some embodiments, a combination of fixed, vertically adjustable, or fixed rotary, or adjustable cutters may be used.

Figure 5:
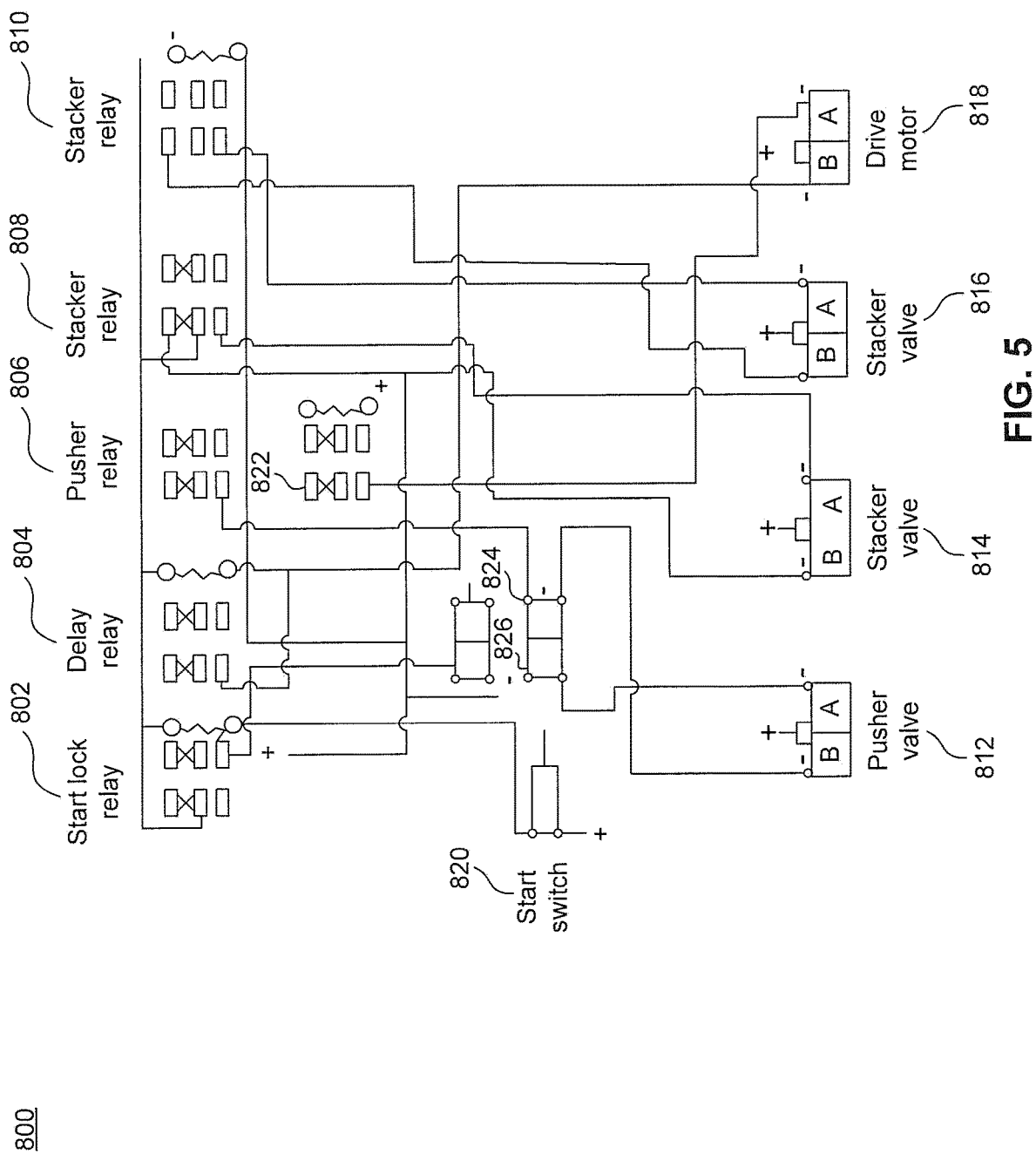
FIG. 5 shows a schematic of an electrical system according to an embodiment.

As shown in FIGS. 1 and 5, in some embodiments, bale processing system 100 may be configured to process a first bale of a first size into unbaled material. Rebaler 200 may be downstream of bale processing system 100, and rebaler 100 may be configured to rebale the unbaled material into a second bale of a second size different than the first size prior to being processed. In some embodiments, rebaler 200 may be independently powered. In some embodiments, rebaler 200 may be a standard baler. In some embodiments, rebaler 200 may include modifications to a standard baler. For example, in some embodiments, the standard pick-up drive may be replaced with a belt. In some embodiments, the conventional PTO shaft is no longer used to power rebaler 200, and is instead replaced with an electric motor, for example, or hydraulic power.

Figure 4:
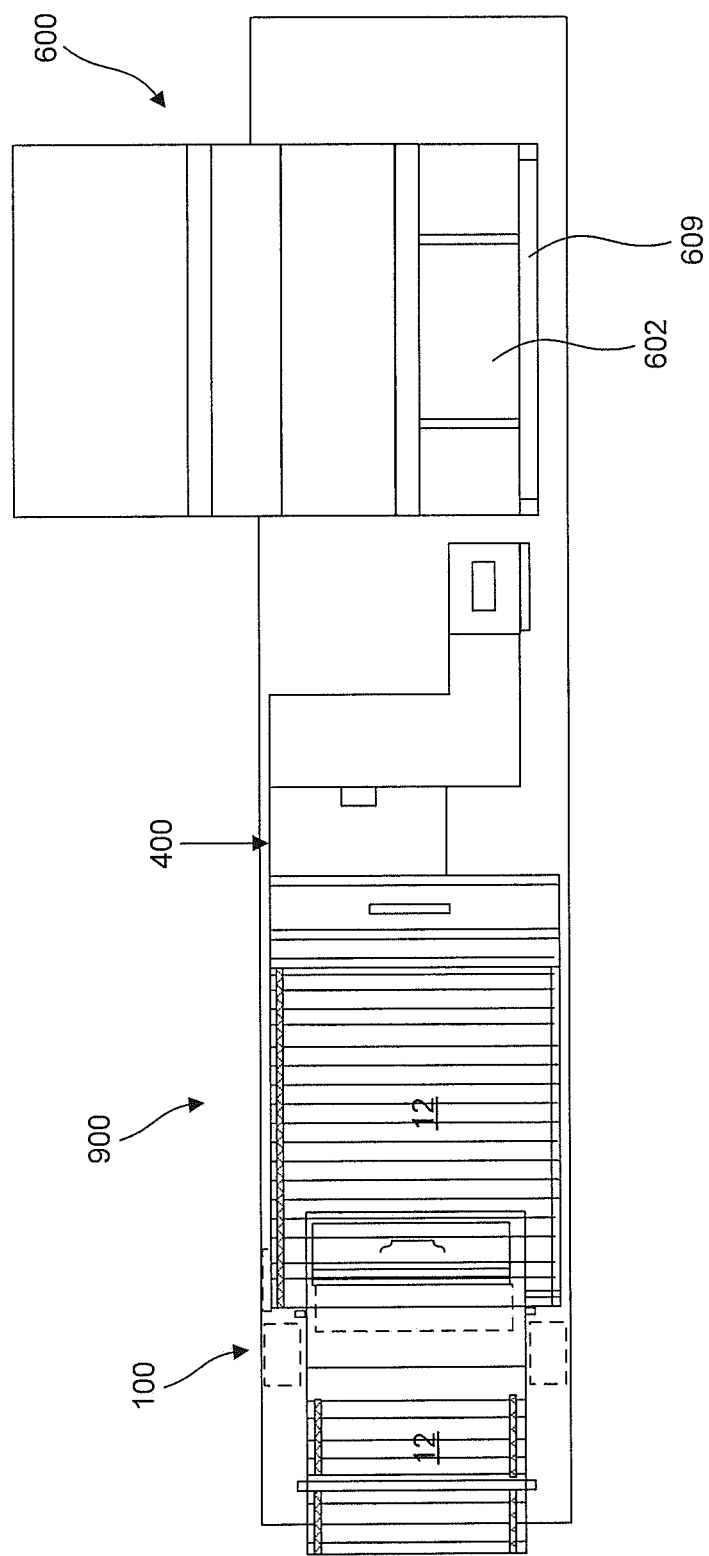
FIG. 4 shows a schematic top view of a rebaling system according to an embodiment.

As shown in at least FIGS. 1 and 4, in some embodiments, rebaling system 10 may include a leveling system 500 configured to mix the unbaled material such that the material input into rebaler 200 is a substantially consistent density. In embodiments, leveling system 500 may mix multiple materials from multiple processors prior to advancing the material into rebaler 200. In some embodiments, leveling system

500 may include a fixed rotary leveling device 502, and a vertically adjustable leveling device 504. In some embodiments, fixed rotary leveling device 502 and vertically adjustable leveling device 504 may be similar to the components of processors 102/104. In some embodiments, the leveling system may include one or more fixed plane sickles or adjustable plane sickles. In some embodiments, processors 102/104 may serve as the leveling system 500. In these respects, safety and efficiency may be improved, as prior systems may require an operator to pull out intertwined hay (carrying risk of injury) or increase the driving force to force uneven density material into the baler, resulting in efficiency losses and inconsistent density. In some embodiments, leveling system 500 may be configured to advance the unbaled material along the system and into the rebaler 200, leveling system 500 being inclined from horizontal along the direction travel of unbaled material. In some embodiments, the various mixes and leveling components of leveling system 500 may be manually adjustable, or the system 10 may automatically adjust the size in response to certain parameters (e.g., bale density, cycle time, electric or hydraulic load, etc.). In some embodiments, leveling system 500 may be configured as a holding box to hold the material for mixing as it is fed into rebaler 200. In this respect, there can be ensured a constant supply of material that is properly mixed to be fed into rebaler 200 when a new large bale is loaded into rebaling system 10.

Leveling system 500 may be adjustably configured to process a first material into a first size and a second material into a second size different than the first size. Leveling system 500 may include a holding box with a material path 12 may including for example, coveyors, sliders, apron chain, space-making chain, augers, etc. Leveling system 500, in some embodiments, may include at least one of a fixed rotary cutting blade 106, a vertically adjustable cutting blade 108, floating auger 110, adjustable rotary cutting blade, and the like. Floating auger 110 may turn the material (e.g., hay, grass, other composition etc.) into a windrow once processed from the larger bale, thereby ensuring proper feed to rebaler 200. In some embodiments, fixed rotary cutting blade 106 and vertically adjustable cutting blade 108 are operatively engaged with each other such that the bale material may be cut to a first size and a second size different than the first size. In some embodiments, the various sizes may be manually adjustable, or the system 10 may automatically adjust the size in response to certain parameters (e.g., bale density, cycle time, electric or hydraulic load, etc.).

In some embodiments, the leveling system 500 may mix and feed a mixture of hay, straw, or other grasses, e.g., alfalfa, into rebaler 200. In some embodiments, leveling system 500 may advance the material at a variable speed the mixing may be adjusted according to desired material flow for blending.

In some embodiments, an additive system may be provided to add, for example, preservatives of flavorings to the mix (e.g., a Gandy box). In some embodiments, these additives may be added at leveling system 500. In some embodiments, these additives may be added at processing system 100, rebaler 200, or recycling system 400.

As shown in at least FIGS. 1 and 4, in some embodiments, rebaling system 10 may include an automatic stacking system 600 having an accumulator 602 configured to receive a second bale, for example, after rebaler 200 has rebaled the material into a smaller bale size. Accumulator 602 may include a first pusher arm 604 configured to advance the second bale and a switch operatively connected to a tilting stacking table 608. In some embodiments, the switch is activated when a predetermined number of second bales are positioned in accumulator 602, and the switch may initiate a tilting operation of tilting stacking table 608 thereby stacking the second bales.

In some embodiments, accumulator 602 may allow, for example, 4 small square bales at a time to accumulate, and then advance the 4 bales onto tilting stacking table 608 in response to a switch being activated. In some embodiments, tilting stacking table 608 may stack the bales 2 bales high and 4 bales wide in response to a switch being activated. In some embodiments, tilting stacking table 608 may then push the stacked bales in bundles of 12 to be picked up by an operator, using a skid steer or fork lift, for example. In some embodiments, automatic stacking system 600 may include, for example, a space making chain configured to stop when the first pusher arm 604 leaves a home position. In some embodiments, when pusher arm 604 returns to the home position, the space making chain again begins to move, thereby filling accumulator 602. In this respect, the present system removes the need for an operator to stack the finished bales, utilizing automatic stacking for unloading with a skidsteer or forklift, for example. In some embodiments, automatic stacking system 600 may be hydraulically driven, utilizing electric limit switches. In some embodiments, automatic stacking system may be driven separately, for example by an electric motor. In some embodiments, automatic stacking system 600 may be driven with the common hydraulic system powering the rebaler system 10 in general.

Turning to FIG. 7, in some embodiments, recycling system 400 may include a drive motor 404 configured to actuate first auger 402 and a controller (not shown) configured to activate the drive motor when a predetermined amount of stray unbaled material is collected. In some embodiments, the recycling system may include a second auger 406 positioned laterally from and operatively engaged with first auger 402, and a third auger 408 positioned laterally from and operatively engaged with the second auger 406, wherein the collected stray unbaled material is advanced from first auger 402 below the rebating system 10 to second auger 406 such that it is advanced to a side of rebaling system 10 and then to third auger 408 such that it is reintroduced into rebaling system 10, in material path 12. In some embodiments, the first auger 402 may include an additional auger 410. Augers 402/410 may be, for example, 6" augers. In some embodiments, the second and third augers 406/408 may be, for example, 10" augers.

In some embodiments, the collected stray unbaled material is reintroduced into bale processing system 100. In some embodiments, the collected stray unbaled material is reintroduced into a rebaler 200. In some embodiments, the collected stray unbaled material is reintroduced into a leveling system 500. In some embodiments, this may increase the efficiency of recycling system 400. In some embodiments, recycling system 400 may be hydraulically powered, or electrically powered. In some embodiments, recycling system 400 may include a floating base for a full system cleaning, for example, allowing approximately 1.5' of drop in the center of the system above the platform. In some embodiments, recycling system 400 is self-contained, for example, in a trailer system 700. In some embodiments, the trailer system may utilize leaf springs positioned on sides of the frame to keep the center of gravity sufficiently low to the ground for transportation.

Figure 6:
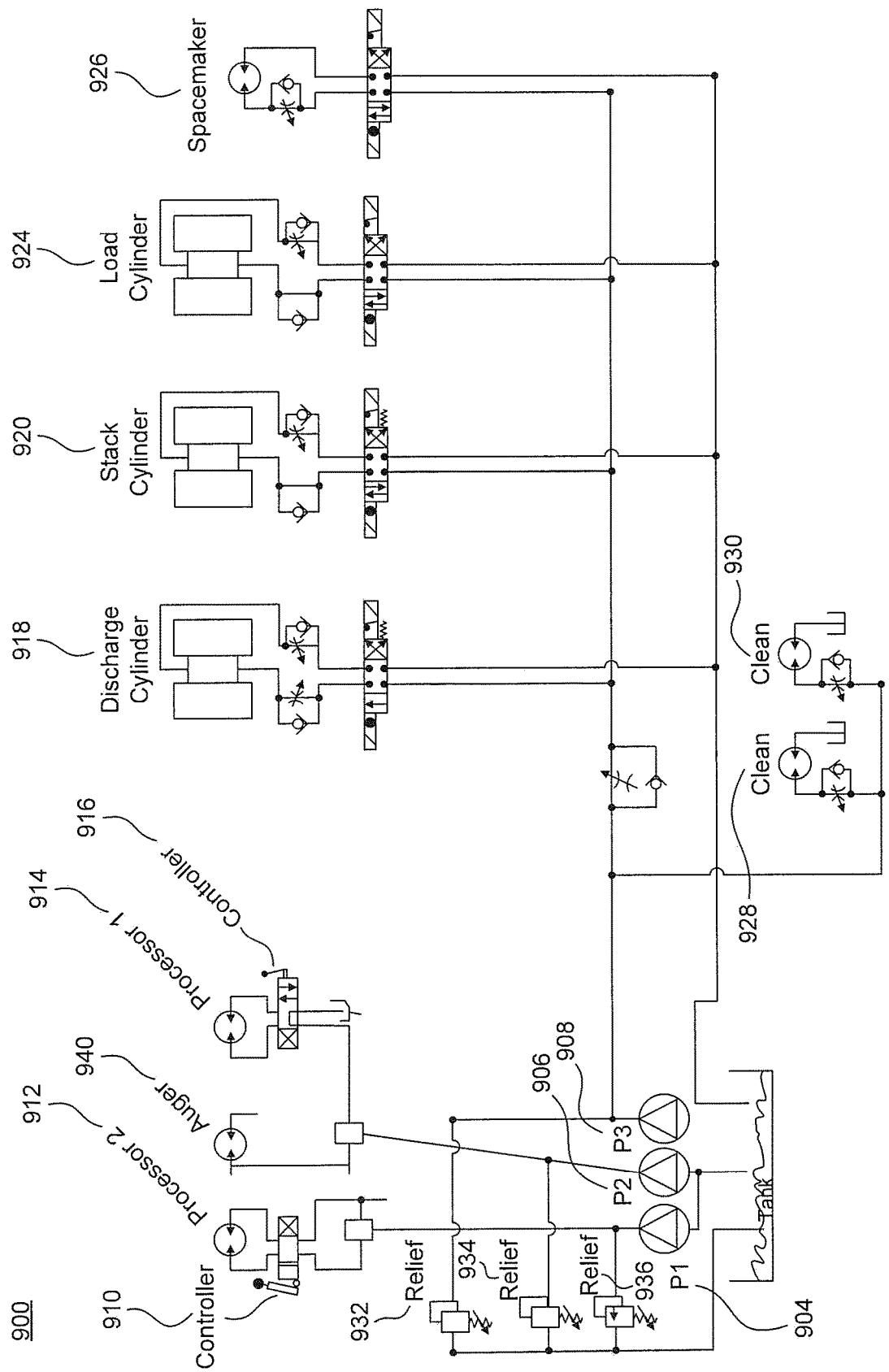
FIG. 6 shows a schematic of an hydraulic system according to an embodiment.

In some embodiments, rebaling system 10 may include an electrical system 800 (for example as shown in FIG. 5) or hydraulic system 900 (for example as shown in FIG. 6). In some embodiments, rebaling system 10 may include a generator to supply electrical power, such as a biodiesel generator powering a hydraulic motor or hydraulic pumps. As shown in FIG. 5, electrical system 800 may include a start switch 820, connected to a start lock relay 802 as a safety feature. Additional relays may include a delay relay 804, the pusher relay 806, and stacker relays 808/810 to operate the automatic stacking system 600. Additionally, electrical system 800 may be configured to supply power to and control various valves, including pusher valve 812, stacker valves 814/816, and supply power to a drive motor 818. In some embodiments, electrical system 800 may include chain relay 822, bail in switch 824 configured to sense when a bail is loaded into the stacker, and limit switch 826 configured to sense when the automatic stacking system 600 has hit the limit of the pusher arm 604.

Turning to FIG. 6, in some embodiments, the hydraulic system 900 may power various valves, hydraulic motors, or other sub-systems of the rebaling system 10. In some embodiments, rebaling system 10 includes a hydraulic tank 902, relief valves 932/934/936, and hydraulic pump (e.g., pumps 904/906/908) to power the material path 12 (e.g., conveyors, sliders, apron chain, space-making chain, etc.). In some embodiments, rebaling system 10 includes a hydraulic pump (e.g. Pumps 902/904 shown in FIG. 6) to power the auger 940 and processor 914 or 912 separate from the hydraulic pump powering material path 12. In some embodiments the hydraulic pump powering the auger and processor may include a manual controller (e.g., controller 910 or 916), such as a manual direct valve, thus improving control of the mixing and processing. In some embodiments, rebaling system 10 may include a separate hydraulic pump 908 to power the recycling system (e.g., clean valves 928/930), along with the stacking system (including cylinders 918/920/924 and spacemaker 926).

Some embodiments are directed to a method of rebaling material, including processing a first bale of a first size into unbaled material using a processing system, advancing the unbaled material to an adjustable leveling system, the leveling system being inclined toward a rebaler, passing the unbaled material through the leveling system such that the density of the unbaled material input into the rebaler is substantially uniform, rebaling the unbaled material into a second bale of a second size different than the first size prior to being processed. In some embodiments, the method may include mixing a first unbaled material and a second unbaled material in the leveling system.

In some embodiments, the first unbaled and second unbaled material are selected from hay, grass, alfalfa, or the like.

In some embodiments, the bale material is inorganic. In some embodiments, the first and second unbaled material are different. In some embodiments, the method may include collecting stray unbaled material, and introducing the stray unbaled material into the leveling system. In some embodiments, the method may include collecting stray unbaled material, and introducing the stray unbaled material into the processing system.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention(s). Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention(s) as contemplated by the inventor(s), and thus, are not intended to limit the present invention(s) and the appended claims.

The present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined only in accordance with the claims and their equivalents.

What is claimed is:

1. A rebaling system, comprising:
   a bale processing system configured to process at least one first bale of a first size into unbaled material, wherein the bale processing system comprises:
      a first processor configured to process a first material; and
      a second processor disposed above the first processor and configured to process a second material;
   a rebaler downstream of the bale processing system, the rebaler configured to rebale the unbaled material into a second bale of a second size different than the first size prior to being processed;
   a leveling system downstream of the bale processing system, the leveling system configured to mix the unbaled material such that the material input into the rebaler is a consistent density;
   a collection platform positioned below a portion of the rebaling system configured to collect stray unbaled material; and
   a recycling system including:
      a first auger operatively engaged with the collection platform to move collected stray unbaled material to be reintroduced to the rebaling system.

2. The system of claim 1, the recycling system further comprising:
   a drive motor configured to actuate the first auger; and
   a controller configured to activate the drive motor when a predetermined amount of stray unbaled material is collected.

3. The system of claim 1, the recycling system further comprising:
   a second auger positioned laterally from and operatively engaged with the first auger; and
   a third auger positioned laterally from and operatively engaged with the second auger, wherein the collected stray unbaled material is advanced from the first auger below a portion of the rebaling system to the second auger such that it is advanced to a portion of a side of the rebaling system and then to the third auger such that it is reintroduced into the rebaler.

4. The system of claim 1, wherein the collected stray unbaled material is reintroduced into the bale processing system.

5. The system of claim 1, wherein the first and second processors are adjustably configured to process the first material into a first material size and the second material into a second material size different than the first material size.

6. The system of claim 1, further comprising:
an automatic stacking system having:
an accumulator configured to receive the second bale, the accumulator having a first pusher arm configured to advance the second bale;
a switch operatively connected to a tilting stacking table, wherein the switch is activated when a predetermined number of second bales are positioned in the accumulator, the switch initiating a tilting operation of the tilting stacking table thereby stacking the second bales.

7. The system of claim 1, wherein each of the first and second processors further comprise:
a fixed rotary cutting blade; and
a vertically adjustable cutting blade operatively engaged with the fixed rotary cutting blade such that the bale material may be cut to a first size and a second size different than the first size.

8. The system of claim 1, wherein the leveling system further comprises:
a fixed rotary leveling device; and
a vertically adjustable leveling device operatively engaged with the fixed rotary leveling device such that the feed of the mixed bale material into the rebaler may be adjusted.

9. The system of claim 1, wherein the leveling system is further configured to advance the unbaled material along the system and into the rebaler, the leveling system being inclined from horizontal along the direction travel of unbaled material.

10. The system of claim 1, wherein the first material and the second material are selected from hay, grass, and alfalfa.

11. The system of claim 1, wherein the first and second material are different.

12. The system of claim 10, wherein the first and second material are different.

* * * * *